April 10, 1934.   J. SKOGMARK ET AL   1,954,366
PROCESS FOR THE PURIFICATION OF GASES
Filed June 30, 1927

Inventors
JOHN SKOGMARK
MARCH F. CHASE
Attorney

Patented Apr. 10, 1934

1,954,366

UNITED STATES PATENT OFFICE 1,954,366

PROCESS FOR THE PURIFICATION OF GASES

John Skogmark and March F. Chase, New York, N. Y.

Application June 30, 1927, Serial No. 202,495

4 Claims. (Cl. 23—178)

This invention relates to processes or methods, for the purification of gases. Although not limited thereto, the invention in one of its embodiments has been found to be particularly adaptable to the purification of gases known as "burner gases" containing sulphur dioxide as used in the manufacture of sulphuric acid. The invention in various of its phases and embodiments is adapted to be used for the purification of sulphur dioxide as well as other gases used in connection with other processes and for various other purposes.

The apparatus includes many of the features shown and described in applicants' copending application Ser. No. 202,493, filed June 30, 1927, issued September 1, 1931, No. 1,821,064 and entitled "Method for the purification of gases", together with additional features and improvements.

The objects of the invention include the provision of a relatively simple and a highly efficient and dependable process for the desired purposes.

Various further and more specific objects, features and advantages will clearly appear from the detailed description given below taken in connection with the accompanying drawing which form a part of this specification.

The invention consists in the process and steps of the process which are hereinafter described according to the preferred manner of practicing the same and the invention may be more particularly pointed out in the appended claims.

Figure 1:
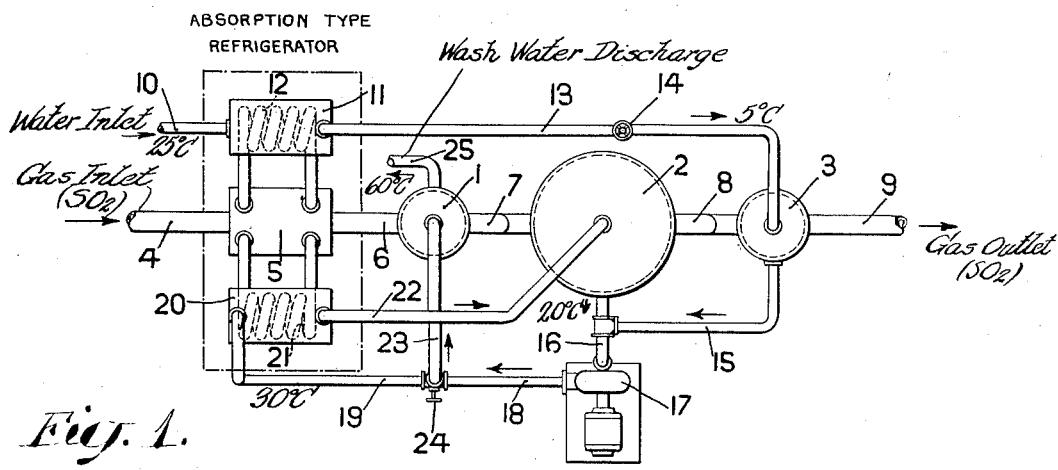
Figure 2:
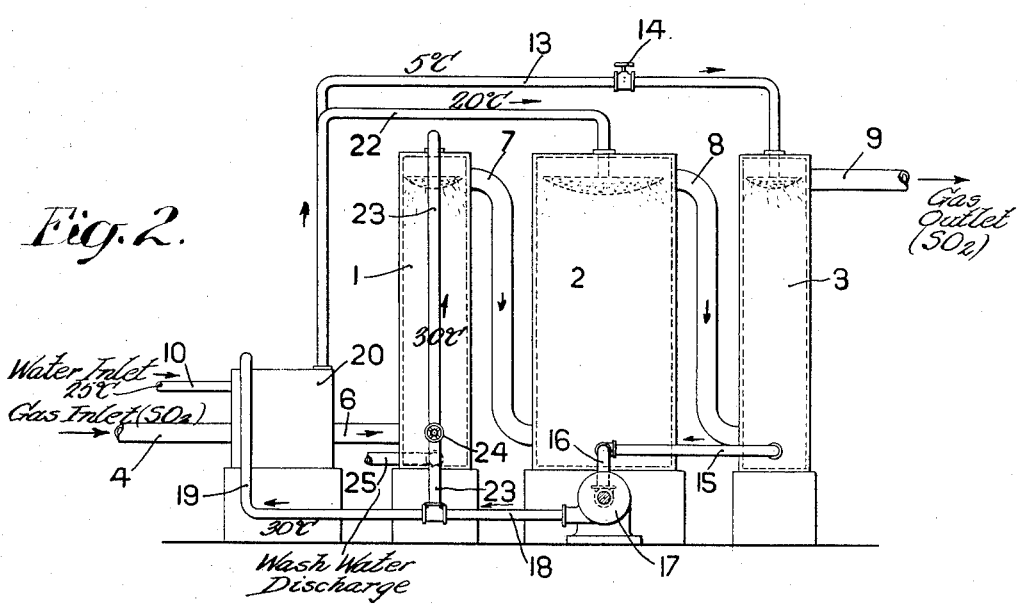

In the drawing, Fig. 1 is a plan view and Fig. 2 is an elevational view of one form of the apparatus.

Referring to the particular apparatus shown in the drawing, the parts designated by the numerals 1, 2 and 3 comprise washing towers or columns packed with suitable packing materials as well known in the art of acid washing. The column 2 is preferably considerably larger than the other columns of the series. The gas to be treated may be conducted from the source of supply through a conduit 4 and into the generator portion 5 of an absorption type refrigerator as indicated on the drawing and then through a conduit 6 into the base of tower 1. The gas under treatment passes up through the tower 1 and is conducted by a conduit 7 from the top of this tower to the base of tower 2. After passing up through the tower 2 the gases are in turn conducted from the top of this tower by a conduit 8 to the base of tower 3. After passing up through the tower 3, the gases may be conducted away through an outlet conduit 9.

The gases in thus passing through this series of washing towers run countercurrent to the flow of a suitable wash liquid, for example, water, supplied from a desired source through conduit 10. The wash water may be conducted first through a cooler 11 forming a part of the refrigerator provided with a cooling coil 12 whereby the temperature of the wash water may be lowered to a desired degree for effecting thorough washing and final cooling of the gases under treatment just before they emerge from the tower 3, the last of the series. The wash liquid is conducted from the cooler 11 to the top of tower 3 through a conduit 13, and the rate of supply may be varied or adjusted by a valve 14 in such conduit. The fresh washing liquid thus first meets the gases under treatment at the time that such gases are about to be discharged through the outlet conduit 9 and hence the discharged gases may not only be finally and thoroughly washed by such fresh liquid, but are also cooled thereby to a degree such as to substantially preclude the presence of moisture therein as the same are discharged.

The fresh supply of wash liquid, after passing through the tower 3, may be conducted from the base of such tower through a conduit 15 to a conduit 16 forming a part of a circulatory path for wash liquid supplied to the tower 2. This circulatory path may comprise a rotary motor driven pump as at 17 supplied with wash liquid from the base of tower 2, together with the relatively fresh incoming liquid from the conduit 15. Such liquid may be pumped through conduits 18 and 19 to a cooler 20 forming a part of the absorption refrigerator similar to the cooler 11, and provided with a cooling coil as at 21. From this cooler the circulatory path continues through a conduit 22 to the top of wash tower 2, then through the tower and from its base back to the pump through conduit 16. Between the pump and the cooler a conduit 23 may be attached to this system for by-passing a part of the circulating liquid out of the circulatory path and through an adjustable valve 24 to the top of column 1. A desired proportion of the wash water may thus be constantly discharged from the circulatory path to the first tower of the series and such discharged liquid passes down through tower 1 and out through a discharge conduit 25 at the base of the tower 1.

As above indicated, this apparatus has been found to be useful in the manufacture of sulphuric acid and specifically in the purification of sulphur dioxide gas in such manufacture. The gas containing sulphur dioxide as used for the sulphuric acid is generally produced by burning brimstone, or pyrites, or by calcining metallic sulphide ores. In each of these cases the resulting gases containing the sulphur dioxide are available in heated condition usually at a temperature higher than 100° C. and contain in addition to sulphur dioxide, materials such as arsenic, chlorine, fluorine, and impurities which are to be removed before the sulphur dioxide passes to the next stage of the process. Such gas is ordinarily purified by washing or scrubbing the same with water and/or sulphuric acid and then filtering in such a manner as to remove both solid and gaseous impurities which may affect the activity of the catalysts customarily used in the further oxidation of the gas in the succeeding stages of the process.

This apparatus is applicable particularly to the purification step comprising the removal of such impurities as arsenic, chlorine, fluorine, etc., which are soluble in water. The operation of the process as carried out in the particular form of apparatus above described may be as follows:

The gases to be purified, while still heated to a temperature usually above 100° C., enter the absorption type refrigerator where a substantial proportion of the energy comprised in the heat of the gases is utilized for the operation of the refrigerator. The gases thus partially cooled pass on to the washing tower 1, where they meet and pass up through a moderately cool spray of wash liquid which has been discharged from the succeeding wash towers. A substantial transfer of heat then takes place between the gas and discharged wash liquid so that the gases are brought to a moderately low temperature, for example, in the neighborhood of 40° C., before being admitted to the wash tower 2. At the same time the discharged wash liquid is raised in temperature, for example, to approximately 60° C., at which temperature it gives up to the current of gas any sulphur dioxide which may have become dissolved therein. The discharged wash liquid is thus passed out of the apparatus without taking with it any substantial amount of the desired gas.

In washing tower 2 the gases may be thoroughly washed by a considerable volume of the wash liquid circulated by the pump 17 and maintained at a moderately low temperature, for example 20° C., by the cooler 20. Although certain of the impurities may be removed by the preliminary washing in the column 1, the major part of the impurities and undesired gases such as arsenic, chlorine and fluorine are removed in column 2. The volume of wash liquid and its temperature as circulated in column 2 may be maintained substantially constant by adjusting the valves 14 and 24 so that the water supplied through the tower 3 is substantially equal to that discharged through the tower 1, except for a very small quantity which may be vaporized and carried away with the gases. As above stated, from the tower 2 the gases are given a final cooling and washing in the tower 3 just before being discharged, so that the last substantial traces of undesired gases are removed, and any moisture taken up by the gases during the washing operation is substantially wholly removed by reason of the lowering of the temperature of the gas as discharged. The temperature of the discharged gas may be for example in the neighborhood of 10° C., and the refrigerated intake water may have a temperature in the neighborhood of 5° C.

The amounts of water discharged from the circulatory system as compared with the amounts kept in circulation will depend upon various factors, such as the temperature of the hot gases, the efficiency of the refrigerator, the dimensions of the washing towers, and other prevailing conditions, and therefore such amounts are best determined by trial, the valves 14 and 24 being adjusted so as to obtain the purified gases in desired condition and so that the discharged wash liquid contains substantially none of the desired gas. However, in view of the preliminary washing effected in column 1, the washing liquid may be circulated for a considerable time without becoming overcharged with impurities and it is found that the washing liquid may be thus very efficiently utilized and the rate of supply of fresh liquid may be kept quite low as compared with the rate of circulation through the column 2.

It will thus be seen that by the use of the above apparatus and process that the heat of the inflowing hot gases is utilized to practical advantage in two ways, namely, to cool and maintain at proper temperature the wash liquid and also to effect recovery of desired gases which would otherwise be carried away in the discharged wash water.

It is not desired to limit the invention to the details or examples herein described since it will be obvious to those skilled in the art, after understanding the invention, that various modifications and substitutions may be made without departing from the scope of the invention, and it is desired therefore in the appended claims to cover all such modifications.

What is claimed as new and desired to be secured by Letters Patent of the United States is:

1. The process of washing hot gas containing sulphur dioxide which comprises passing the same relatively slowly through a flow of wash water circulated and maintained at a moderately low temperature, gradually withdrawing a fractional portion of the circulated wash water, subjecting the incoming hot gas to a preliminary washing and cooling by passing the same through the circulated wash water withdrawn, whereby the wash water will be heated and the sulphur dioxide extracted therefrom, gradually supplying fresh refrigerated wash water to the system and subjecting the outgoing gases to a final cooling by passing the same through the fresh refrigerated wash water whereby the gases will be cooled to a temperature substantially precluding the presence therein of water vapor.

2. In the purification of hot gas, the steps comprising circulating a washing liquid and contacting it with the gas, cooling the circulated liquid and withdrawing a portion of it, contacting said portion with the hot gas before the gas reaches the said circulating washing liquid and discharging said withdrawn portion, and contacting cooled washing liquid with the gas after the said washing stage.

3. In the purification of hot burner gases containing sulphur dioxide, the steps comprising circulating water and contacting it with the gases, cooling the water while circulating it, continuously withdrawing a portion of the circulated water, contacting said portion with the hot gases before they reach the circulated water and discharging said withdrawn portion, contacting cooled water with the gases leaving the circulated water and adding the said cooled water to the circulating water.

4. In the purification of burner gases heated to over 100° C. and containing sulphur dioxide, the steps comprising circulating water in contact with and countercurrent to the stream of gases, cooling the circulated water to about 20° C. and continuously withdrawing a portion of said circulated water, heating it to about 60° C. by contacting it with and in countercurrent relation to the stream of hot gases to be washed and discharging said withdrawn portion, passing water cooled to about 5° C. in contact with and countercurrent to the stream of gases which have passed through the washing stage and adding said cooled water to the circulated water.

JOHN SKOGMARK.
MARCH F. CHASE.